(12) United States Patent
Sheshadri et al.

(10) Patent No.: US 8,725,790 B2
(45) Date of Patent: May 13, 2014

(54) MULTIPLE APPLICATION ACTIVATION

(75) Inventors: Supreeth K. Sheshadri, Auburn, WA (US); Mathew D. Sorensen, Seattle, WA (US)

(73) Assignee: Big Fish Games, Inc., Seattle, WA (US)

( * ) Notice: Subject to any disclaimer, the term of this patent is extended or adjusted under 35 U.S.C. 154(b) by 901 days.

(21) Appl. No.: 11/955,194

(22) Filed: Dec. 12, 2007

(65) Prior Publication Data
US 2009/0157794 A1   Jun. 18, 2009

(51) Int. Cl.
*G06F 15/16* (2006.01)
(52) U.S. Cl.
USPC ............. 709/202; 717/127; 717/174; 705/40; 705/50
(58) Field of Classification Search
USPC ........................................................ 709/202
See application file for complete search history.

(56) References Cited

U.S. PATENT DOCUMENTS

| | | | |
|---|---|---|---|
| 8,216,071 B2* | 7/2012 | Lee et al. ........................ | 463/42 |
| 2002/0107795 A1 | 8/2002 | Minear et al. | |
| 2003/0088515 A1* | 5/2003 | Cooper et al. ................... | 705/50 |
| 2003/0181242 A1* | 9/2003 | Lee et al. ......................... | 463/42 |
| 2005/0261062 A1* | 11/2005 | Lewin et al. .................... | 463/42 |
| 2006/0059571 A1* | 3/2006 | Chen et al. ...................... | 726/29 |
| 2006/0117314 A1* | 6/2006 | Sato ............................. | 717/174 |
| 2006/0120697 A1* | 6/2006 | Beged-Dov et al. .......... | 386/125 |
| 2006/0136964 A1* | 6/2006 | Diez et al. ....................... | 725/37 |
| 2007/0143228 A1* | 6/2007 | Jorden et al. .................... | 705/71 |
| 2007/0233782 A1* | 10/2007 | Tali .............................. | 709/203 |
| 2007/0259709 A1 | 11/2007 | Kelly et al. | |
| 2009/0064055 A1* | 3/2009 | Chaudhri et al. ............. | 715/863 |

OTHER PUBLICATIONS

PCT International Search Report and Written Opinion for PCT Application No. PCT/US08/86509 mailed on Feb 18, 2009, 7 pgs.

* cited by examiner

*Primary Examiner* — Tauqir Hussain
(74) *Attorney, Agent, or Firm* — Lee & Hayes, PLLC

(57) ABSTRACT

A technique for multiple application activation is disclosed. The technique includes a client device receiving from a server an indication of applications available to purchase and a user selecting at least two of the indicated applications to be purchased. Then at least one of the applications is automatically received on the networked computer in response to the applications being selected. A second of the applications is automatically received after the first application has been received. While the second application is being received, the first of the applications is automatically installed and activated.

17 Claims, 15 Drawing Sheets

Big Fish Games: A New Free Game Download Every Day – Microsoft Internet Explorer https://store.st.bigfishgames.com/cart.php?productID=412&siteID=1

BIG FISH Games

A New Game Every Day!

Welcome supreeth.sheshadri@bigfish...  ⊙Sign Out  ⊙Cart

300

🔒 Secure Form

🛒 Shopping Cart

Our Site is Secure

CHASE
Paymentech

🛒 1. Shopping Cart  2. Delivery Info  3. Payment Info  4. Order Confirmation

Currency: US Dollars ⌄

| Product Name | Unit Price | Quantity | Subtotal | Delete |
|---|---|---|---|---|
| Bejeweled 2 Deluxe | $19.99 | 1 | $19.99 | 🗑 |
| Zuma Deluxe | $19.99 | 1 | $19.99 | 🗑 |
| ☑ Yes! Send me a free CD<br>Your CD will include a free<br>full-version bonus game and<br>20 free trial games!  You pay<br>Only for shipping and handling<br>($7.99). | $7.99 | 1 | $7.99 | 🗑 |

302
304

Have a coupon code?

[          ]  Apply Code          Subtotal: $47.97

Continue Shopping or  ▶ Check Out

Big Fish Games: A New Free Game Download Every Day – Microsoft Internet Explorer https://store.st.bigfishgames.com/billing.php Welcome supreeth.sheshadri@bigfish... ● Sign Out ● Cart BIG FISH Games A New Game Every Day!

400

Payment Info

✓ 1. Shopping Cart ✓ 2. Delivery Info ▶ 3. Payment Info / 4. Order Confirmation

402

☐ Secure Form

Our Site is Secure

CHASE
Paymentech

Billing Information

☑ My billing address is the same as my shipping address.

First Name:* [Supreeth]
Last Name:* [Sheshadri]
Country:* [United States ▼]
Address:* [100 Fourth Ave. II Suite 800]
City:* [Seattle]
State:* [Washington ▼]
Zip:* [98002]

Select Payment Method*: [Visa ▼]
Credit Card Number*: [4111111111111111]
Expiration Date*: Month [10 ▼] Year [2009 ▼]

MULTIPLE APPLICATION ACTIVATION

BACKGROUND

This application relates to simultaneously activating multiple applications including those that are protected with a digital rights management (DRM) system on a client device received from a content server, and more specifically relates to purchasing multiple applications on a server from a browser on a user computer where the applications are simultaneously downloaded and installed and activated on a user computer.

Software applications are purchased from a web server by a user viewing the application available for purchase using a client computing device. The user selects and then purchases the application. The application is then downloaded to the client device from a web server. The user then selects the program to be installed once it is downloaded. If the user wants to select a second application, the user would then select that second application. That application is then downloaded and installed on the client computing device. Each time the user purchases an application, the user must manually select a first icon on a screen to start the download process, and then select another icon corresponding to a second application when the user wants to purchase and download the second application.

Requiring the user to click on a new icon and enter a unique activation key, every time the user activates a new application takes time and degrades the user's experience. Further, multiple user interactions with the content server may increase processing and bandwidth costs for the content provider.

SUMMARY

A computer-implemented technique is disclosed for receiving from a server an indication of applications available to purchase. The technique involves a user selecting at least two of the indicated applications to be purchased. Then at least one of the applications is automatically received on the networked computer in response to the applications being selected. A second of the applications is automatically received after the first application has been received. While the second application is received, the first of the applications is automatically installed and activated.

In another embodiment, a video game delivery system is disclosed. The system includes a content server (e.g. a remote computer) and a networked computer (e.g. a client device or client electronic device). The server includes a processor and a memory. The server memory has instructions which when executed by the processor comprise providing an indication of applications available to purchase to the networked computer and receiving a selection from the networked computer of at least two the indicated applications to be purchased. At least one of the applications is automatically delivered to the client device in response to the plurality of applications being selected. A second of the applications is automatically delivered to the networked computer after the first application has been received. The networked computer includes a computer processor and a memory. The memory of the network computer has instructions which when executed by the computer processor receive an indication of applications available to purchase from the server. The instructions also select at least two of the plurality of the indicated applications to be purchased. The networked device automatically receives from the server at least one of the applications in response to the applications being selected. A second of the applications is automatically received from the server after the first application has been received. The networked computer automatically installs and activates on the first of the applications during the reception of the second of the applications.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIGS. 3-13 depict illustrative screen displays on the client device during the process shown in FIG. 2.

DETAILED DESCRIPTION

The following document describes method(s) or software capable of permitting simultaneous purchase, downloading and installation of software applications, such as a video game. The method may be provided by any content server, and may be purchased and received by, installed, and activated on any networked electronic device such as a computer, PDA, computer laptop or gaming device. Various examples of the method and software for multiple game activations are described below with reference to FIGS. 1-12.

Example System Architecture

Figure 1:
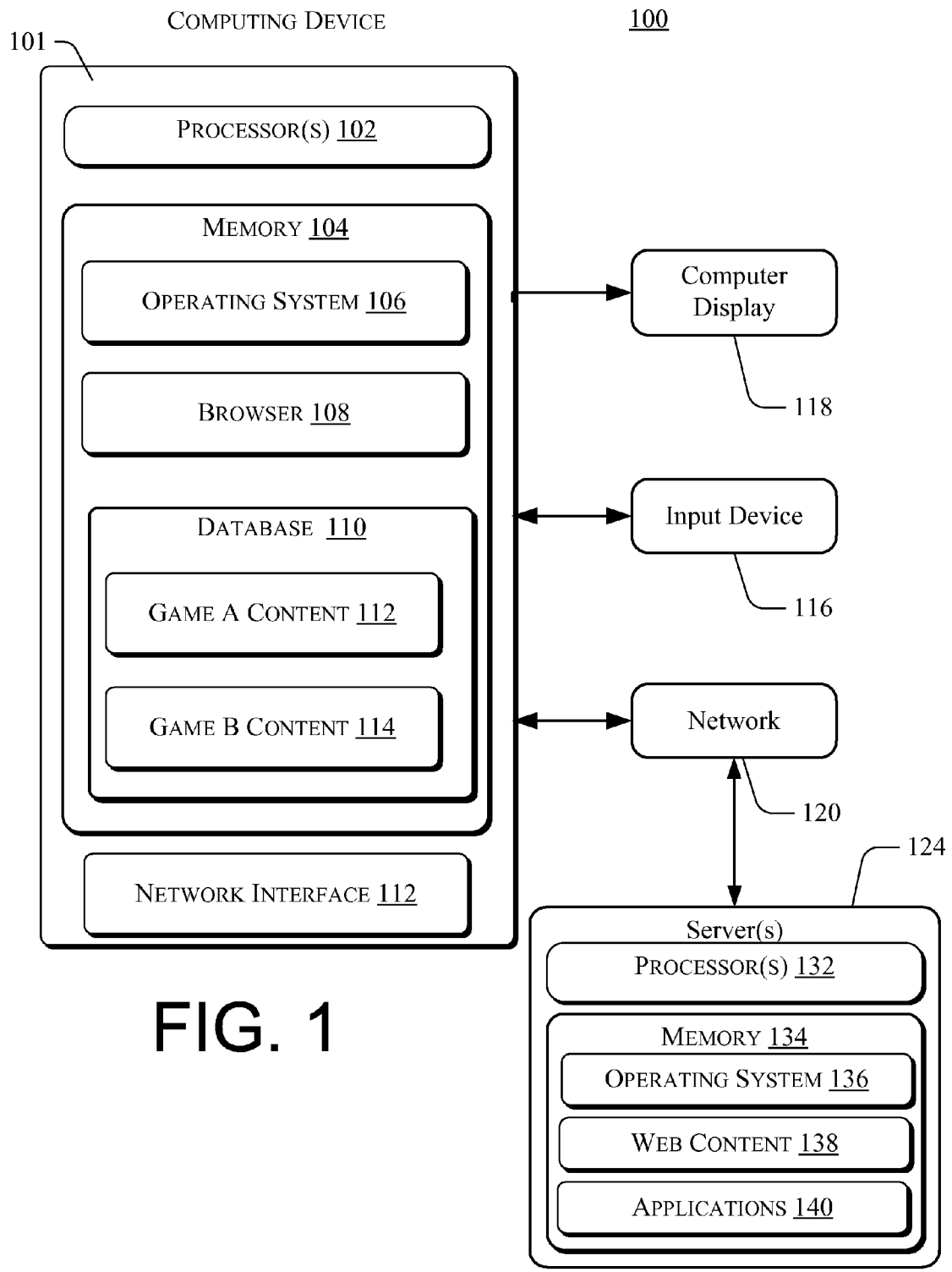
FIG. 1 depicts an exemplary system in which the multiple activation application is implemented.

The computer environment 100 illustrated in FIG. 1 is a general computer environment that includes a user interface which can provide a multiple computer applications, such as video game to a user. Similar resources may use the computer environment and the processes as described herein. The computer environment 100 is only one example of a computer environment and is not intended to suggest any limitation as to the scope of use or functionality of the computer and network architectures. Neither should the computer environment 100 be interpreted as having any dependency or requirement relating to any one or combination of components illustrated in the exemplary computer environment 100.

The computer environment 100 includes a general-purpose computing device in the form of a client device (also referred to as a networked device) 101. The client device 101 can be, for example, one or more of a stand alone computer, laptop computer, a networked computer, a mainframe computer, a PDA, a telephone, a microcomputer or microprocessor, or any other computer device that uses a processor in combination with a memory. The components of the client device 101 can include, but are not limited to, one or more processors or processing units 102 (also herein referred to as processor 102), a system memory 104, network interface 112 and a system bus (not shown) that couples various system components including the processor 102, network interface 112 and the system memory 104.

The memory 104 can comprise a variety of computer readable media. Such media may be any available media that is accessible by the playing device 101 and includes both volatile and non-volatile media, and removable and non-removable media. The process for activating instructions can be stored as instructions sets on the computer readable media.

The system memory 104 may include the computer readable media in the form of non-volatile memory such as read only memory (ROM) and/or volatile memory such as random access memory (RAM).

The client device 101 may also include other removable/non-removable, volatile/non-volatile computer storage media. By way of example, memory 104 may include a hard disk drive (not shown) for reading from and writing to a non-removable, non-volatile magnetic media (not shown), and an optical disk drive, for reading from and/or writing to a removable, non-volatile optical disk such as a CD-ROM, DVD-ROM, or other optical media. The hard disk drive and optical disk drive may each be directly or indirectly connected to the system bus.

The disk drives and their associated computer-readable media provide non-volatile storage of computer readable instructions, program modules, and other data for the client device 101. Although the example depicts a hard disk within the hard disk drive, it is to be appreciated that other types of the computer readable media which can maintain for accessing data that is accessible by a computer, such as non-volatile optical disk drives, floppy drives, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computer environment 100.

Memory 104 may be a magnetic disk non-volatile optical disk, ROM and/or RAM. Stored in memory 104, including by way of example, may be an operating system (OS) 106, a browser 108 (including other applications or plug-ins for the browser), database 110 and network interface 112.

A user can enter commands and information into the client device 101 via input devices 116 such as a microphone, curser controller keyboard and/or a pointing device (e.g., a "mouse") which send a signal to the processing unit 102 in response to commands from the user. Other input devices (not shown specifically) may include a joystick, game pad, satellite dish, serial port, scanner, and/or the like. These and other input devices are connected to the processing unit 102 via input/output interfaces (not shown) that are coupled to the system bus of client device 101, but may be connected by other interface and bus structures, such as a parallel port, game port, or a universal serial bus (USB).

An LCD monitor, flat panel displays, touch screen displays, or other type of computer display 118 can also be connected to the system bus via a video interface (not shown), such as a video adapter. In addition to the computer displays 118, other output peripheral devices can include components such as speakers (not shown) which can be connected to the computer playing device 101.

The client device 101 can operate in a networked environment using logical connections to one or more remote computers, such as a remote computer 124 through network 120. By way of example, the remote computer 124 can be a personal computer, portable computer, one or more servers, a router, a network computer, a peer device or other common network node, game console, and the like. The remote computer 124 can be a server that can include many or all of the elements and features described herein relative to the client device 101.

For example, the components of the server 124 can include, but are not limited to, one or more processors or processing units 132 (also herein referred to as server processor 132), a system memory 134, network interface (not shown) and a system bus (not shown) that couples various system components including the processor 132, network interface and the system memory 134. Stored in system memory 134, including by way of example, may be an operating system (OS) 136, web content 138 (including applications to deliver the web content) to be provided to browser 108 and applications 140 (e.g. game content).

Logical connections between the client device 101 and the remote computer 124 (e.g. a service provider) are depicted as a network 120 an Internet (or Intranet) which may include a local area network (LAN) and/or a general wide area network (WAN). Application 112 and 114 may be initially stored on the remote computer 124 and be downloaded from the network 120 onto memory 104 in client device 101. Client device 101 may communicate to the remote computer 124 using any communications media via network 120 using network interface 112.

Various modules and techniques may be described herein in the general context of the computer-executable instructions, such as program modules, executed by one or more computers or other devices. Generally, program modules include routines, programs, control objects, components, control node data structures, etc. that perform particular tasks or implement particular abstract data types. Often, the functionality of the program modules may be combined or distributed as desired in various embodiments.

Operating system 106 manages the interaction between the various applications, modules and tools in memory 104 and devices 116-118. Operating system 106 may a Windows® operating system built into the device 102 and available from Microsoft, Inc. of Redmond, Wash. and may include an additional middleware interfaces. Browser 108 may communicate with the operating system directly or via the middleware interface to purchase, download, obtain and activate applications (e.g. applications 112, 114 or 140) from the remote computer 124. The applications may be stored in database 110, e.g. Game A content 112 and Game B content 114.

Operating system 136 manages the interaction between the various applications, modules and tools in memory 134. Operating system 106 may a server based operating system built into the device 124 and available from various manufacturers, such as Microsoft, Inc. of Redmond, Wash. and may include an additional middleware interfaces. Web based applications (included with web content 138) may communicate with the operating system directly or via the middleware interface to enable the purchase, download, and activation of applications (e.g. applications 112, 114 or 140) by the client device 101.

An implementation of the aforementioned computer video game may be stored on some form of the computer readable media (such as optical disk) or transmitted from the computer media via a communications media to a game player computer. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any process or technology for storage of information such as computer readable instructions, control node data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer playing device.

Various modules and techniques may be described herein in the general context of the computer-executable instructions, such as program modules, executed by one or more computers or other devices. Generally, program modules include routines, programs, control objects, components, control node data structures, etc. that perform particular tasks or implement particular abstract data types. Often, the functionality of the program modules may be combined or distributed as desired in various embodiments.

Exemplary Process

Figure 2A:
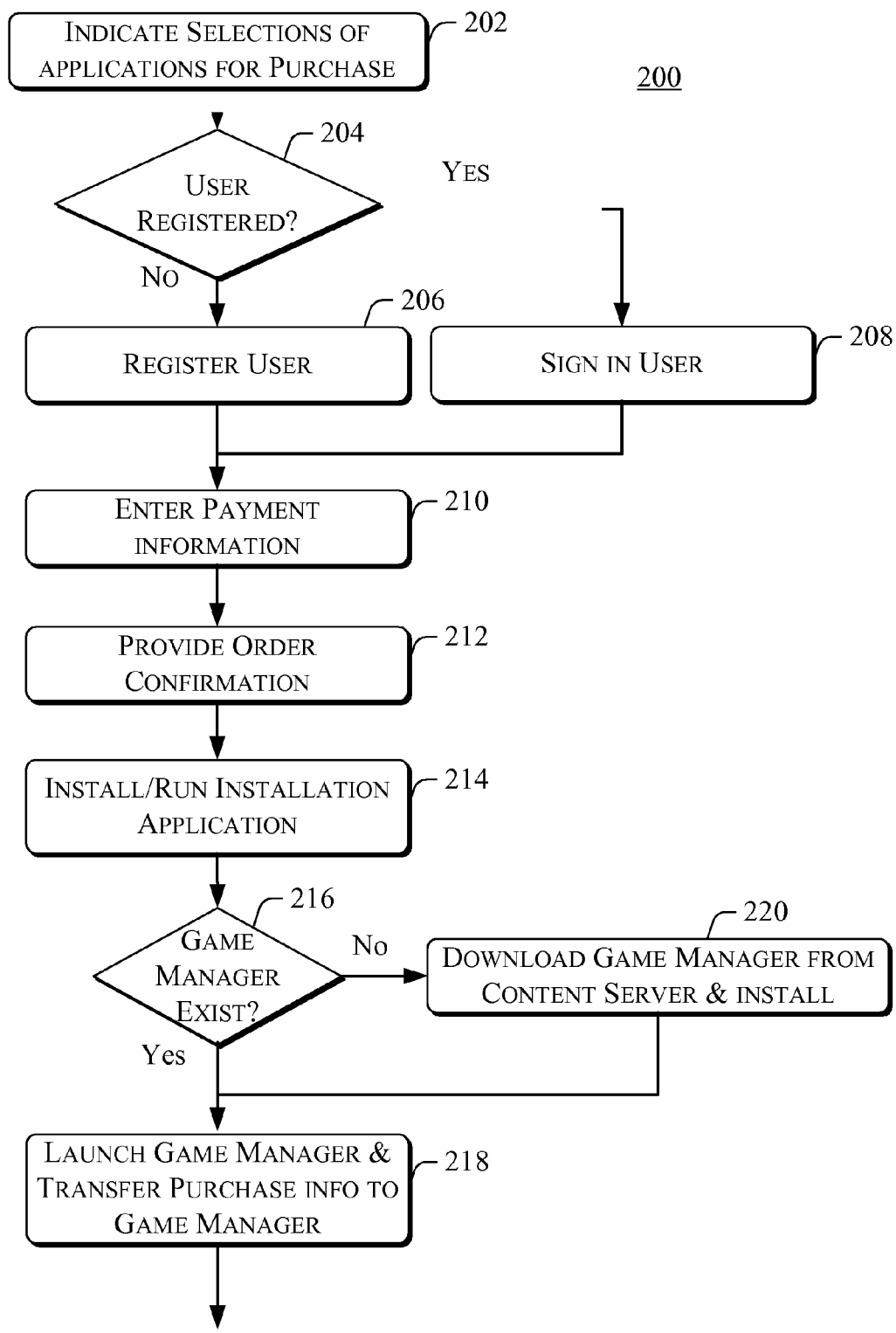
FIG. 2 depicts an illustrative process for simultaneously downloading multiple applications from a server and activating the applications on a client device.
Figure 2B:
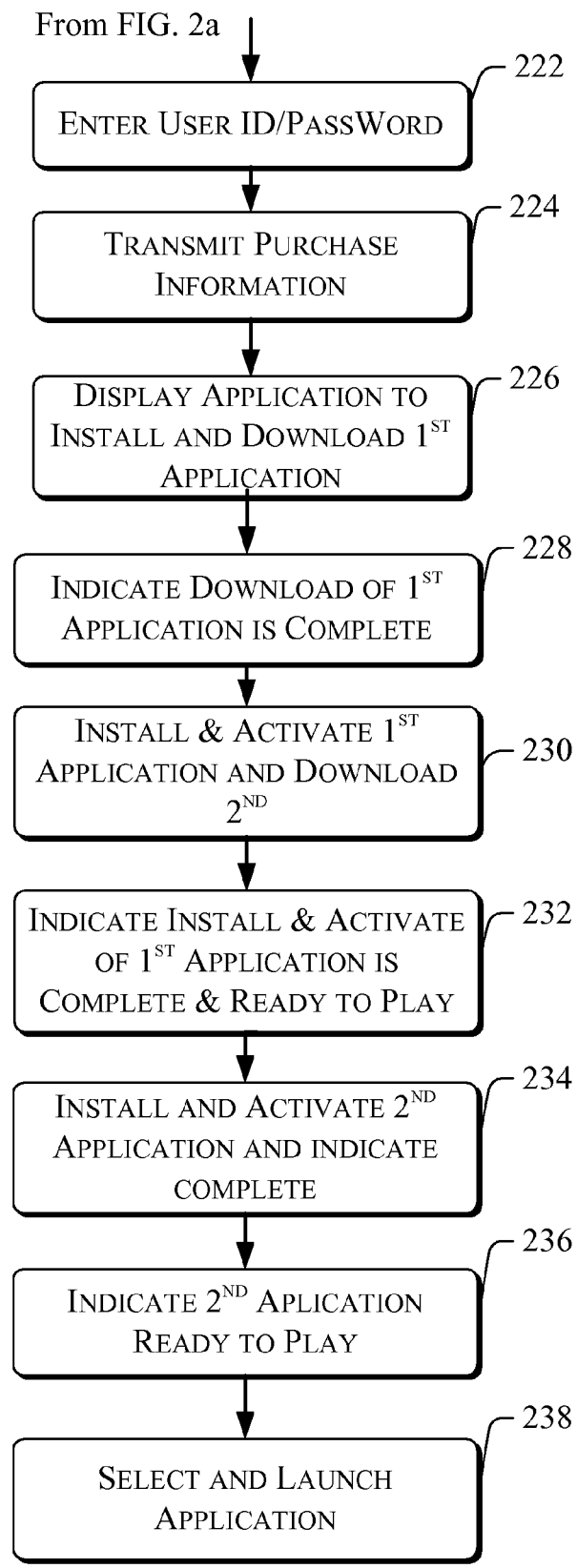

Exemplary process 200, shown in FIG. 2, is illustrated as a collection of blocks in a logical flow diagram. The flow diagram depicts exemplary blocks 202-238 used by processor 102 in system 100 (see FIG. 1), to enable the purchase, download and activation of content. Blocks 202-238 represent a sequence of operations that can be implemented in hardware, software, and a combination thereof. Implementing these blocks results in the displays, illustrated in FIGS. 3-12, to be shown on client device 101. These displays will be described along with the description of blocks 202-238 herein.

In the context of software, the blocks 202-238 represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to system 100 of FIG. 1, although it may be implemented in other system architectures. Although downloading and activation of two applications are being described, many more applications may be automatically downloaded an activated.

In FIG. 2a, the user activates a browser on the client device 101 and then enters a web site address corresponding the location of the remote computer 124. Upon the client device 101 accessing the entered web address, an indication of application is provided to the client device 101 from the remote computer 124. The indication is displayed in the browser of the client device. The user then selects the applications that the user wants to purchase, and the selections are provided from the remote computer 124 to the browser of the client device 101. The selections are displayed on the browser in the client device 101 at block 202. The user confirms the selection by selecting a checkout using the input device 116.

This indication of the selections that the user wants to purchase is illustrated in a browser window 300 FIG. 3. FIG. 3 shows the user application selections 302 and 304 and the checkout box 306.

At block 204, a determination is made as to whether or not the user is registered. If the user is not registered, a window is displayed on the client device 101 enabling the user to register to obtain the application. If the user is already registered, the user is prompted to sign in by entering a user identification code and a password.

Next at block 210, the user enters payment information into the browser. FIG. 4a shows a display within browser window 400 on the client device 101 where the user enters payment information 402. Exemplary payment information includes name, address, credit card type and number, and card expiration date. After entering the information, the user selects an enter key resulting in payment information being sent to the remote computer 124. The remote computer 124 confirms the payment information.

Figure 4B:
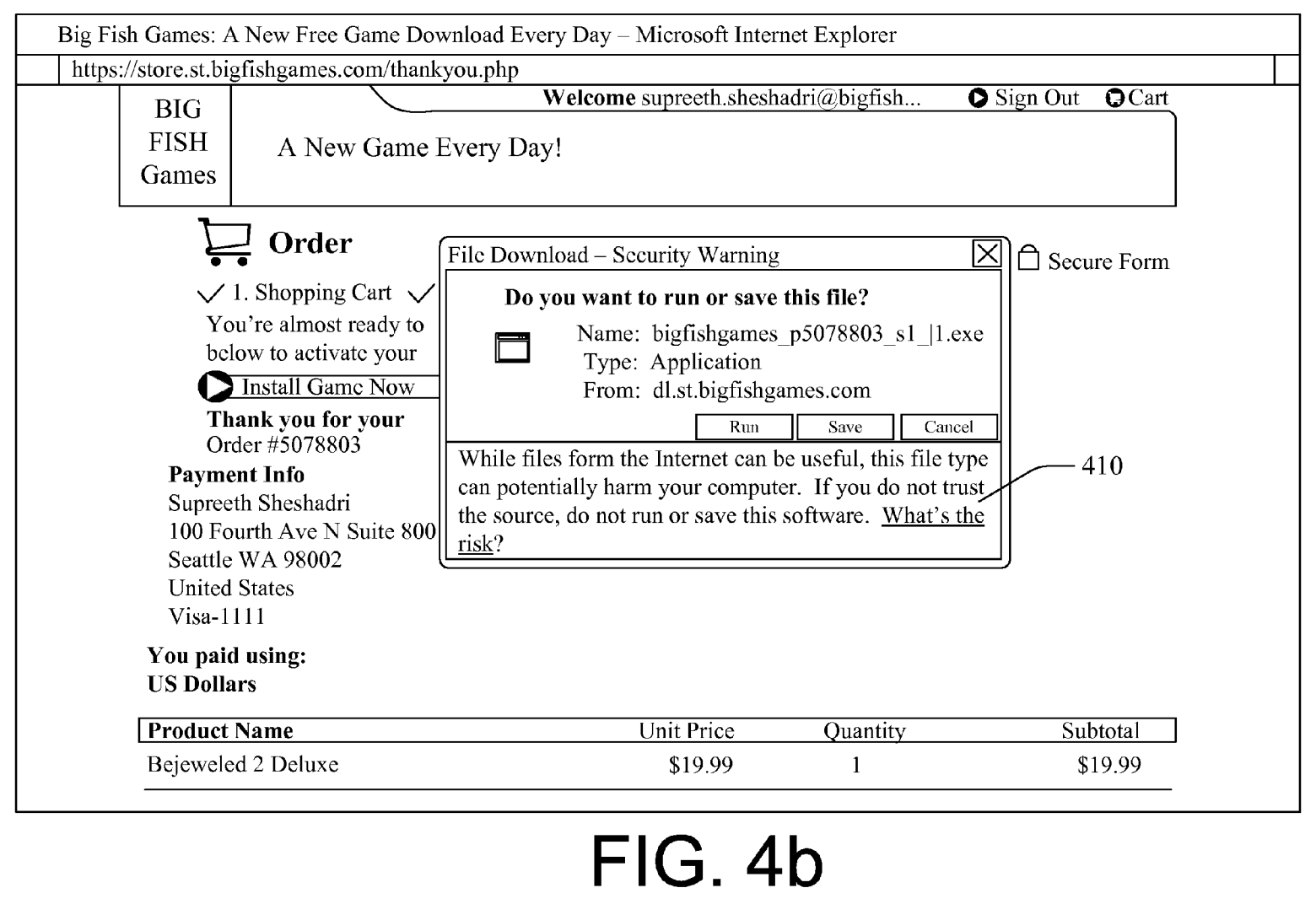

At block 212, the remote computer 124 sends an order confirmation to the client device 101 for display in the browser. At block 214, the user selects an Install Game Now button and the installation application is downloaded to the client device 101 from the remote computer 124. FIG. 4b shows a display within browser window 410 on the client device 101. After a successful download, the installation application attempts to determine at block 216 if an application Manager (referenced as "manager") program is installed within the client device 101. If the manager program is installed on client device 101 ("yes" to block 216), then the installation application at block 218 launches the manager program and sends transaction identification information to manager application as an Inter-process communication message. If the manager program is not installed ("No" to block 216), at block 220 the message is transmitted to client device 101 from content server 124 for installation and then launched at block 218 by the installation application along with the transaction identification information sent to manager as an Inter-process communication message.

Figure 5:
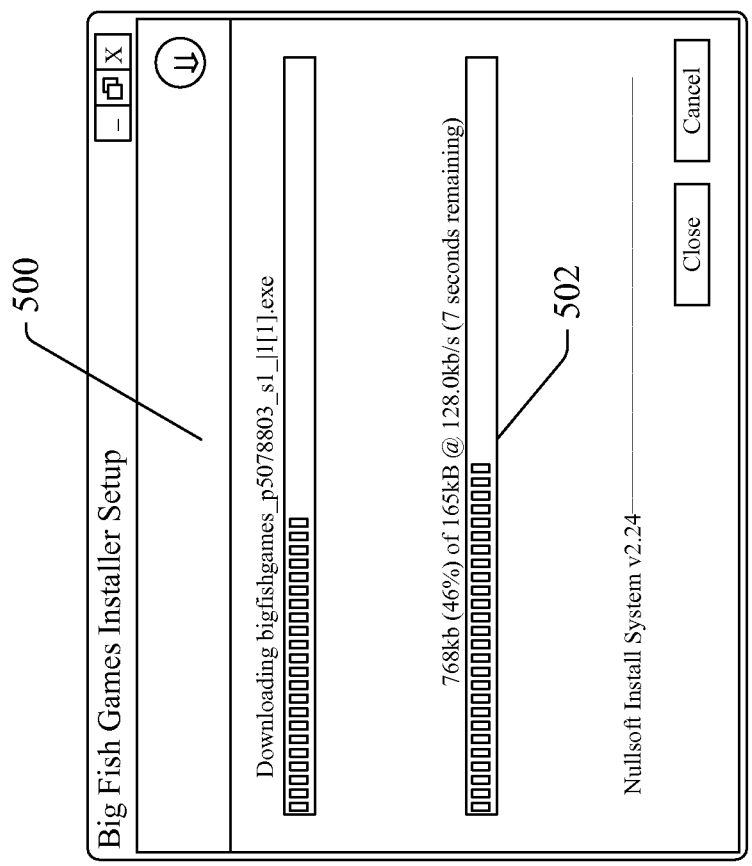

FIG. 5 shows the browser providing a window 500 that indicates the progress of the manager program download. In the window 500, the progress of the manager program is indicated by bar 502. Once the manager program is downloaded, it self installs. At block 222, as part of the manager program download, the user enters their email address.

Figure 6:
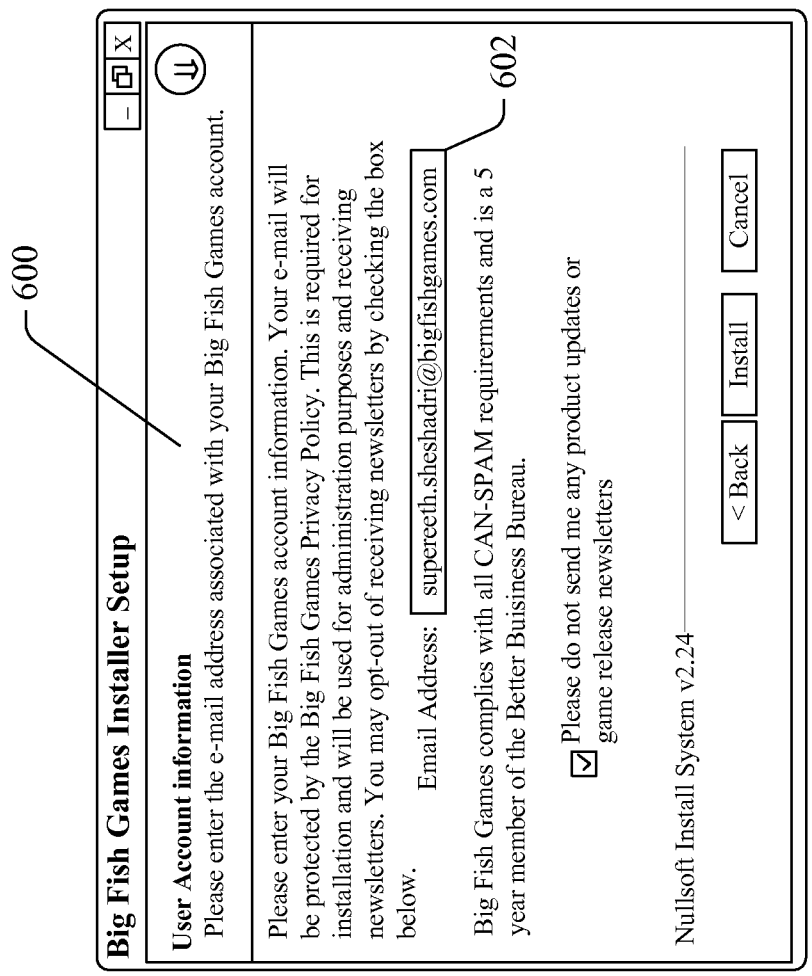
Figure 7:
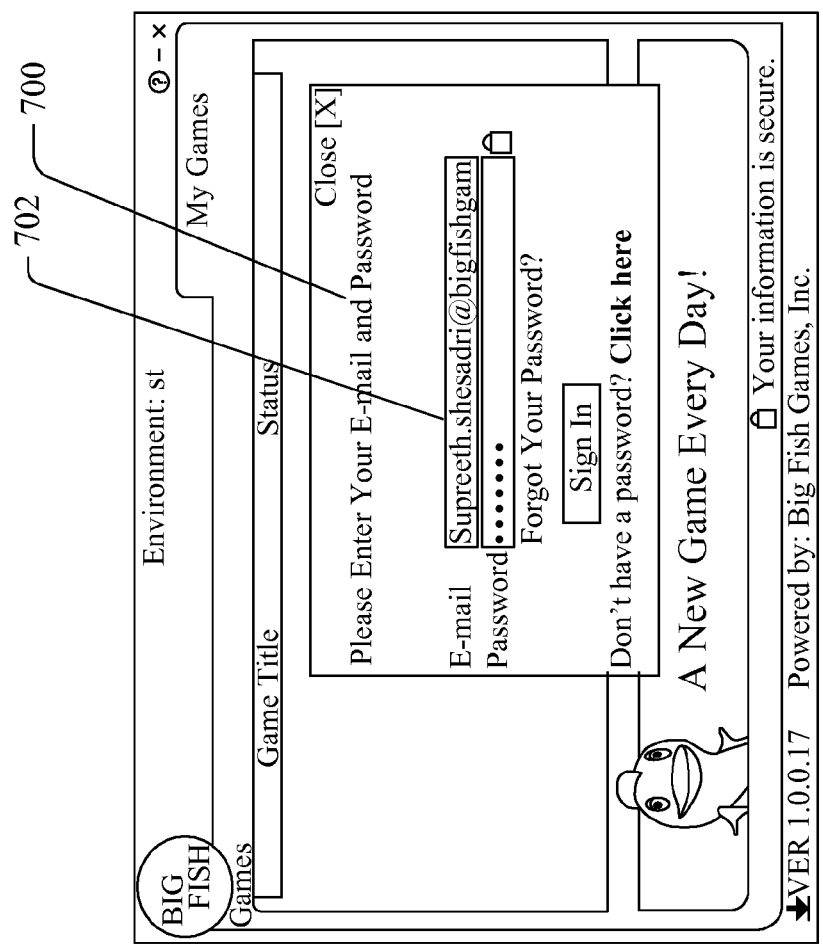

FIG. 6 shows a window 600 depicting an entry location 602 for the user to enter their e-mail address. In FIG. 7, there is shown window 700 with a location 702 to enter the e-mail address and password. Once the password has been entered, a signal is sent to the remote computer 124 confirming the account information and transaction identification information.

At block 224, the client device 101 retrieves the application purchase information pertaining to the transaction identification information. Once the account information has been confirmed, the remote computer 124 sends information indicating the applications that were purchased to the client device 101 pertaining to the transaction identification information. At block 226, the applications to be installed are indicated in a window on the client device 101, the first application is downloaded and the progress of the download is indicated.

Figure 8:
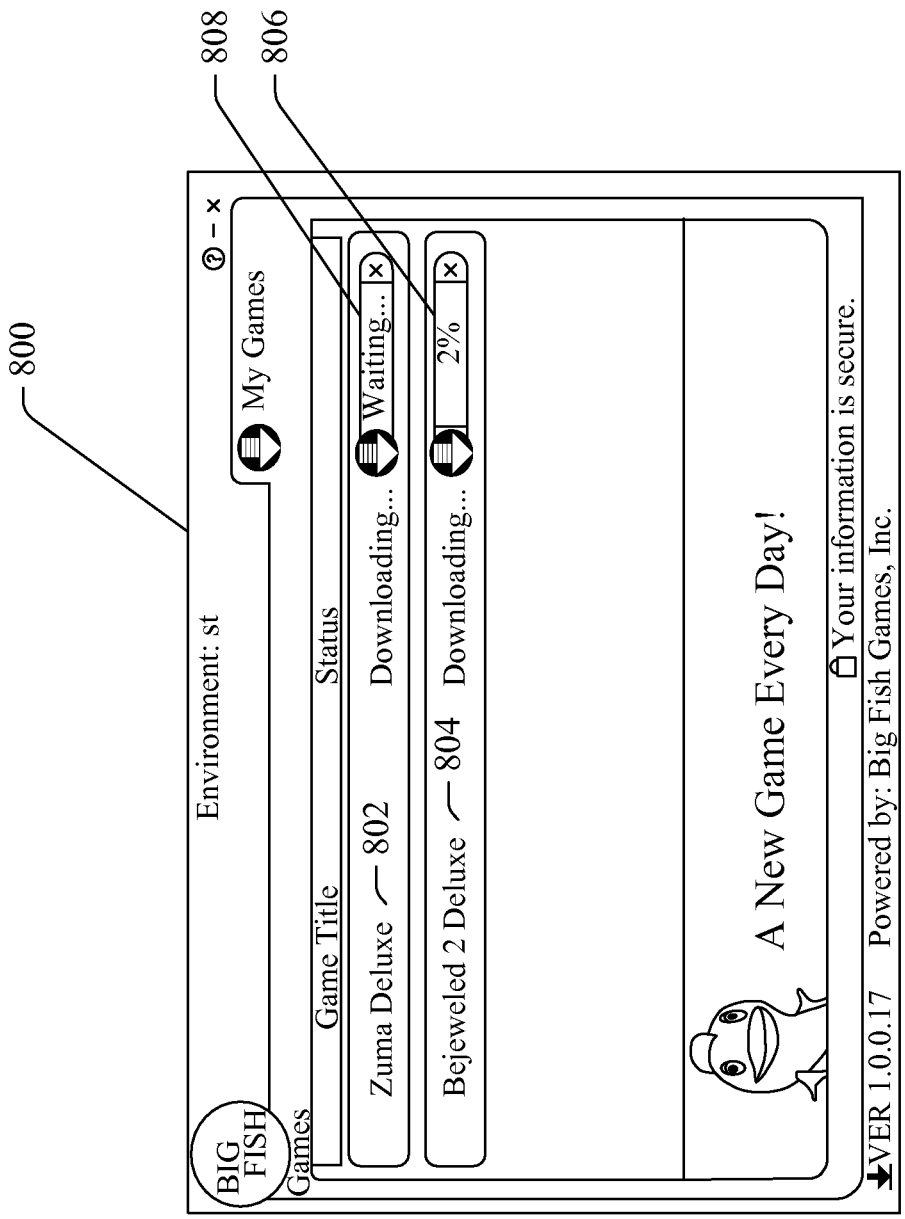

FIG. 8 shows window 800 with applications 802 and 804 being displayed. Bar 806 indicates the progress of the download of the first application. Another indication bar 808 is also provided indicating that the second application is waiting for the first application to complete its download.

Figure 9:
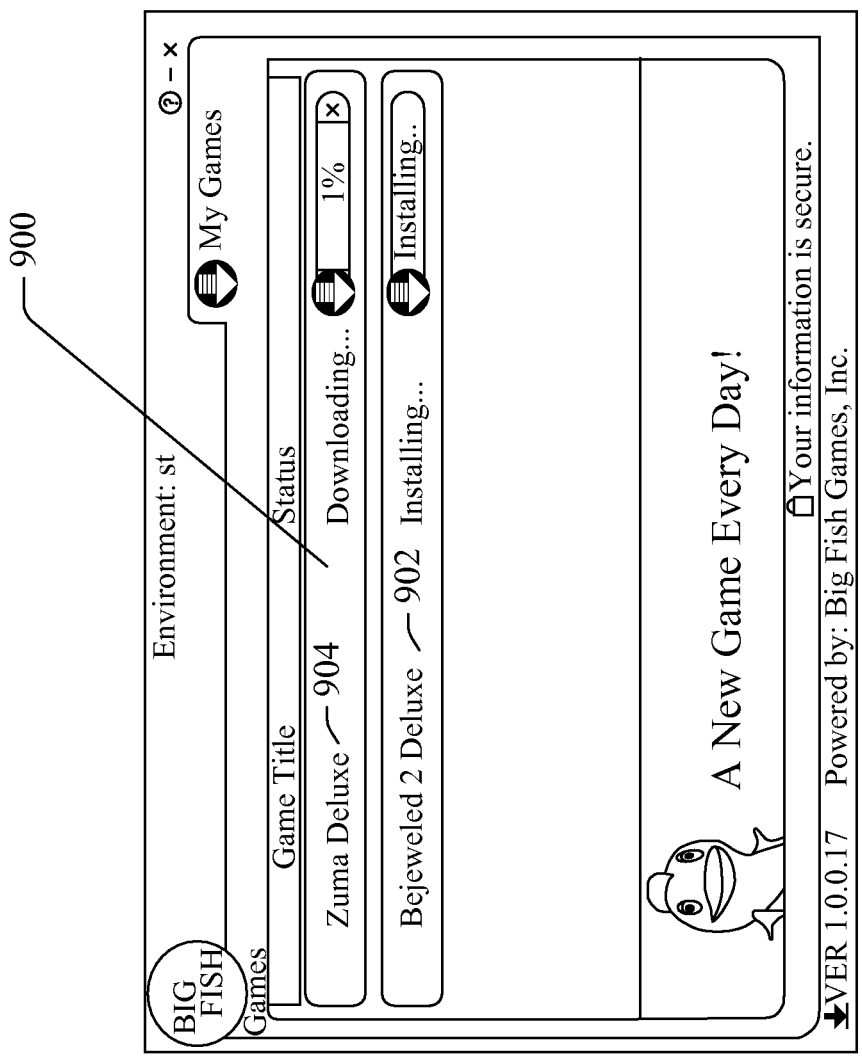

At block 228, an indication is provided that the download of the first application is complete. In block 230, the first application is installed on the client device 101, and the second application is started. FIG. 9 shows in window 900 that application 902 is being installed, and that application 904 is being downloaded.

Figure 10:
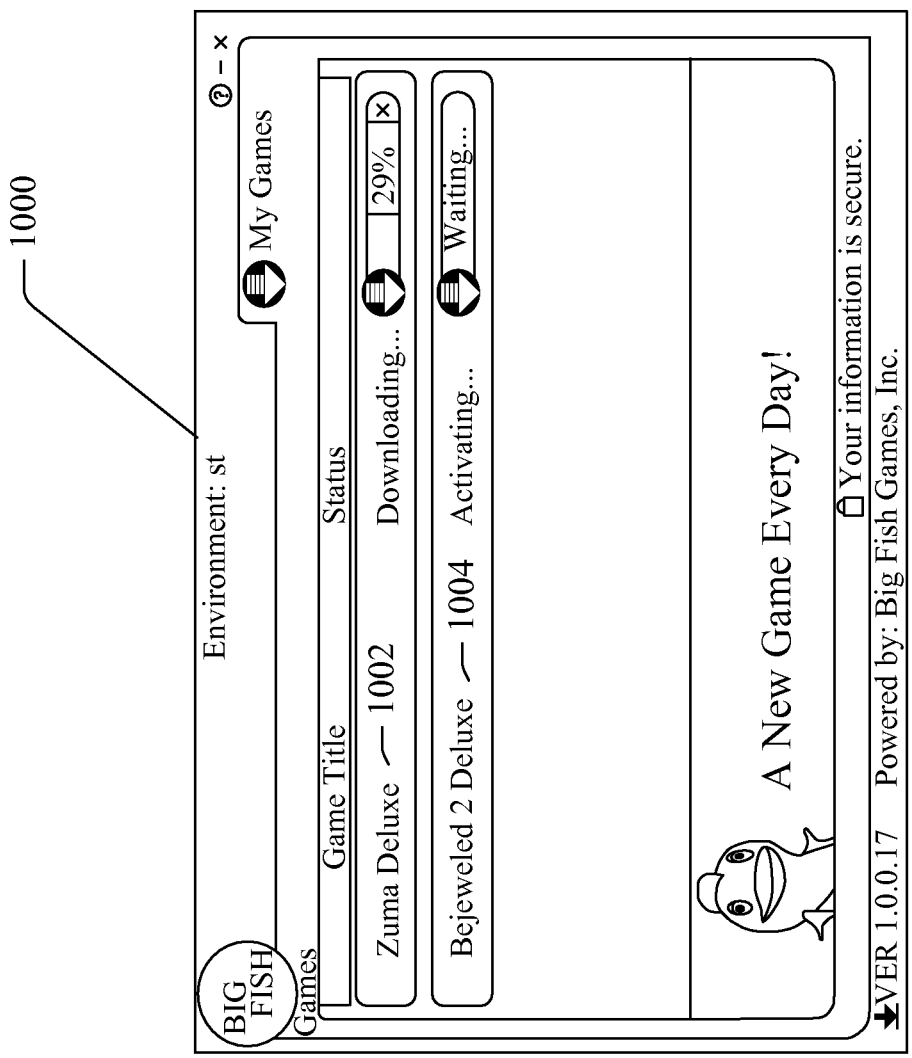
Figure 11:
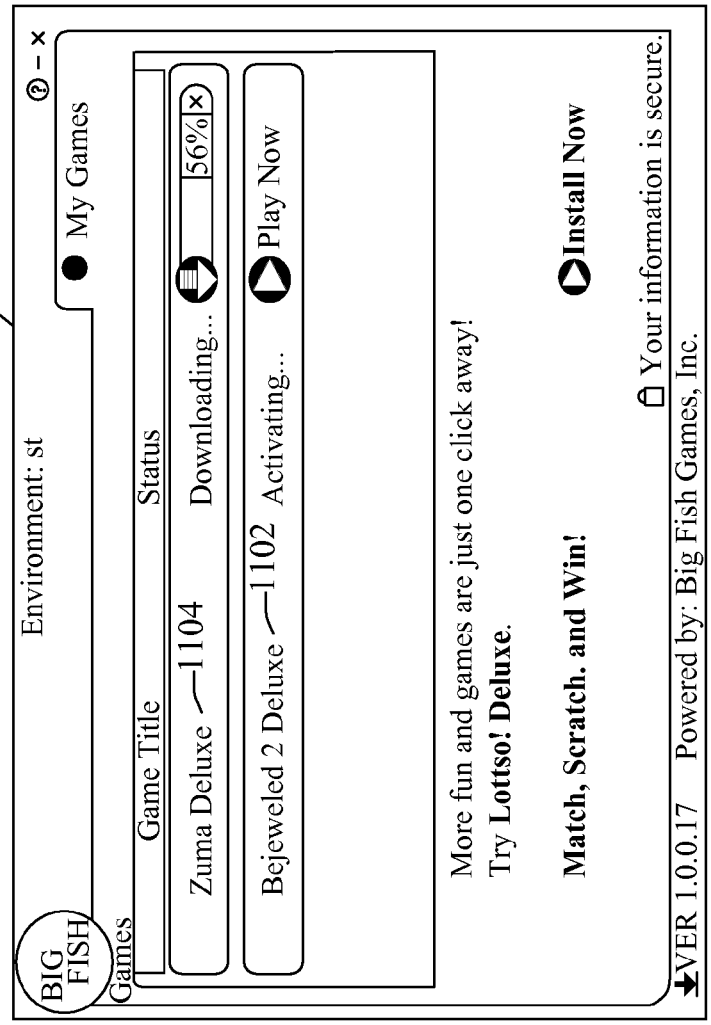

At block 232, an indication is provided that the first application has been completely installed along with an indication of the status of the download of the second application. Once the application has been downloaded and installed the application is activated by removing any security features that prevent the running of the application. Activation is achieved by client device 101 sending a signal indicating client device hardware information and application information to remote computer 124 requesting to generate a unique key. Once the account information, application information and hardware information are confirmed, remote computer 124 sends activation key to client device 101. Client device 101 uses this key to automatically unlock the application. FIG. 10 shows in window 1000 that the first application 1002 is being activated and that the second application continues to be downloaded. FIG. 11 shows in window 1100 that the first application 1102 has been installed and is ready to be executed, and shows that the second application 1104 is still being downloaded.

Figure 12:
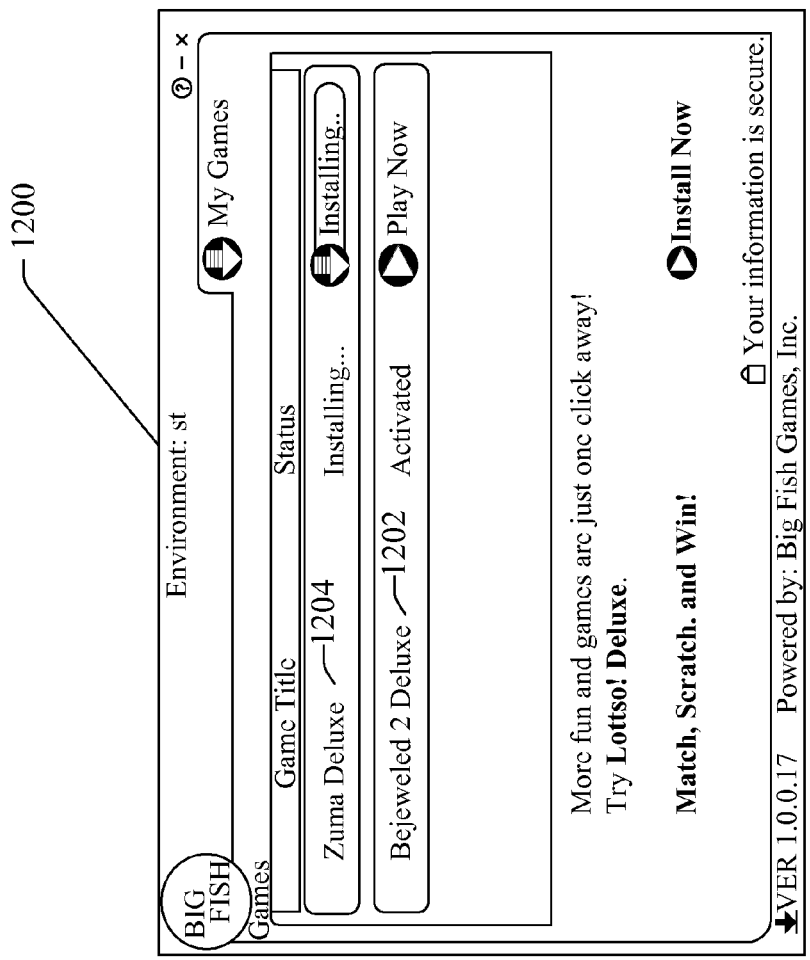

At block 234, the second application's download is completed, and the second application is automatically installed on the client device 101. An indication is provided on the client device 101 that the second application is being installed. FIG. 12 shows an indication in window 1200 in which the first application 1202 is being activated and the second application 1204 is being installed.

Figure 13:
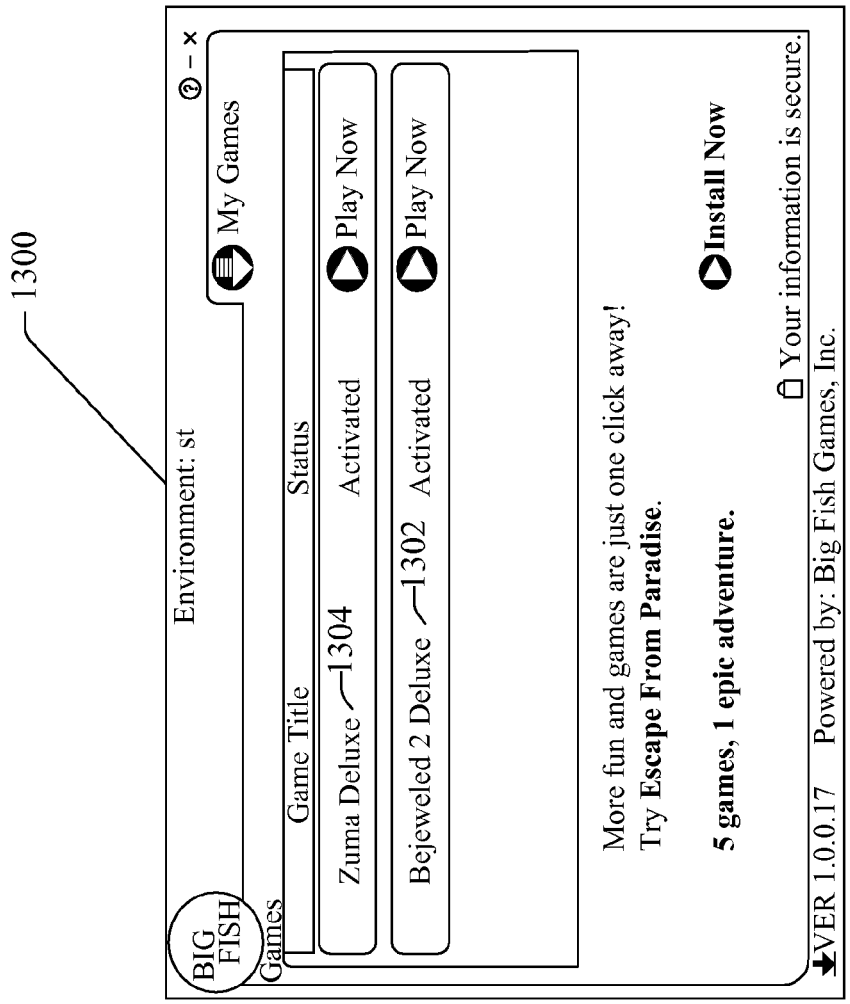

Once the second application is installed and activated, an indication is provided that both applications are ready to be executed in block 236. FIG. 13 shows in window 1300 that the first application 1302 and the second application 1304 are activated and ready to be launched. At block 238, the user selects one of the applications using the input device 116. The client device 101, in response to receipt of the user selection, launches the selected application.

CONCLUSION

In closing, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
employing a processor that executes instructions retained in memory, the instructions, when executed by the processor, implement the following operations:
receiving an indication of a plurality of applications available to purchase;
selecting and purchasing at least two of the plurality of the applications;
automatically receiving a first of the at least two purchased plurality of applications;
automatically receiving a second of the at least two purchased plurality of applications after the first purchased application has been received;
in response to a determination that an application manager is installed, launching the application manager;
in response to a determination that the application manager is not installed at the client device, downloading the application manager to the client device;
receiving, by the application manager, transaction identification information as an inter-process communication message; and
automatically installing and activating, utilizing the transaction identification information, the first purchased application during reception of the second purchased application.

2. The method as recited in claim 1, further comprising automatically installing and activating the second purchased application after the first purchased application has been installed and activated.

3. The method as recited in claim 2, further comprising:
indicating on a display a status of receipt and installation of the first and second purchased applications during the receipt and installation of the first and second purchased applications.

4. The method as recited in claim 2, further comprising:
simultaneously indicating that the first purchased application has been received and that the second purchased application is being received.

5. The method as recited in claim 1, wherein the indication of a plurality of applications available to purchase is received from a web site on a content server via a telecommunications network, and wherein at least one of the plurality of applications is automatically received from the content server.

6. The method as recited in claim 1, wherein each of the plurality of applications is a software game.

7. The method as recited in claim 1, wherein selection and purchase of the at least two of the plurality of applications is performed in response to an indication by a user selection of applications on a web browser.

8. The method as recited in claim 1, further comprising receiving the second purchased application after a complete copy of the first purchased application has been received on a user computer.

9. The method as recited in claim 1, further comprising automatically installing the second purchased application after the first purchased application has been installed and activated.

10. The method as recited in claim 1, further comprising automatically launching the first purchased application after the first purchased application has been installed and activated.

11. A non-transitory computer readable medium having instructions that, when executed by one or more processors, perform operations comprising:
providing an indication of a plurality of applications available to purchase;
receiving a selection of at least two of the plurality applications to be purchased;
automatically delivering, to a client device, a first of the at least two of the purchased plurality of applications;
determining whether an application manager is installed at the client device;
in response to a determination that the application manager is not installed at the client device, downloading the application manager to the client device;
in response to a determination that the application manager is installed at the client device, transmitting transaction identification information to the application manager as an inter-process communication message, the transaction identification information being used to install the first purchased application; and
automatically delivering, to the client device, a second of the at least two of the purchased plurality of applications after the first purchased application has been received such that the first purchased application is automatically installed and activated during reception of the second purchased application.

12. The non-transitory computer readable medium as recited in claim 11, wherein the second purchased application is automatically installed and activated after the first purchased application has been installed and activated.

13. The non-transitory computer readable medium as recited in claim 12, wherein the operations further comprise:
indicating on a display a status of receiving and installing the first and second purchased applications during receipt and installation of the first and second purchased applications.

14. A system comprising:
a server including a processor and a memory, the memory comprising instructions that, when executed by the processor, perform operations comprising:
providing an indication of a plurality of applications available to purchase to the client device;
receiving a selection from the client device of at least two of the plurality of the applications for purchase;

automatically delivering a first of the purchased at least two of the plurality of applications;
automatically delivering a second of the purchased at least two of the plurality of applications after the first purchased application has been received;
determining whether an application manager is installed at the client device;
in response to a determination that the application manager is not installed at the client device:
  initiate downloading of the application manager to the client device;
  determining a progress of the downloading of the application manager to the client device; and
  causing presentation, via the client device, of the progress of the downloading of the application manager, the application manager self-installing on the client device upon completion of the downloading of the application manager;
in response to a determination that the application manager has been downloaded to, and has been self-installed at, the client device, transmitting transaction identification information to the application manager as an inter-process communication message; and
a client device including a computer processor and a computer memory, the computer memory including instructions that, when executed by the computer processor, perform operations comprising:
  receiving the indication of the plurality of applications available to purchase from the server;
  selecting the at least two of the plurality of applications for purchase;
  automatically receiving from the server the first purchased application;
  automatically receiving the second purchased application from the server after the first purchased application has been received;
  launching the application manager and receiving, by the application manager, the transaction identification information; and
  automatically installing and activating on the client device, utilizing the transaction identification information, the first purchased application while receiving the second purchased application, the first purchased application being activated by:
    sending a signal indicating hardware information, application information, and a request for a unique key; and
    once the unique key is received, utilizing the unique key to unlock the first purchased application.

15. The system as recited in claim 14, wherein the second purchased application is automatically installed and activated after the first purchased application has been installed and activated.

16. The system as recited in claim 14, wherein the operations further comprise indicating a status of the receiving and the installing of the first and second purchased applications while the first and second purchased applications are being received and installed.

17. The non-transitory computer readable medium as recited in claim 11, wherein the operations further comprise:
  determining a progress of the downloading of the application manager to the client device; and
  causing presentation, via the client device, of the progress of the downloading of the application manager, the application manager self-installing on the client device upon completion of the downloading of the application manager.

* * * * *